(12) United States Patent
McDysan et al.

(10) Patent No.: US 9,438,935 B2
(45) Date of Patent: Sep. 6, 2016

(54) HYBRID VIDEO SELECTION, DELIVERY, AND CACHING

(75) Inventors: David E. McDysan, Great Falls, VA (US); Daniel J. O'Callaghan, Fairfax Station, VA (US); Stevan H. Leiden, Norwood, MA (US); Douglas M. Pasko, Bridgewater, NJ (US); John E. Rathke, Southborough, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 676 days.

(21) Appl. No.: 12/953,238

(22) Filed: Nov. 23, 2010

(65) Prior Publication Data

US 2012/0131622 A1    May 24, 2012

(51) Int. Cl.
| | |
|---|---|
| H04N 7/173 | (2011.01) |
| H04N 21/222 | (2011.01) |
| H04N 21/231 | (2011.01) |
| H04N 21/24 | (2011.01) |
| H04N 21/6405 | (2011.01) |
| H04N 21/6408 | (2011.01) |

(52) U.S. Cl.
CPC ...... *H04N 21/222* (2013.01); *H04N 21/23113* (2013.01); *H04N 21/2402* (2013.01); *H04N 21/6405* (2013.01); *H04N 21/6408* (2013.01)

(58) Field of Classification Search
CPC ............. H04N 21/23113; H04N 21/222; H04N 21/6408; H04N 21/6405; H04N 21/2402; H04N 47/10; H04N 47/11; H04N 49/90
USPC .......... 725/93, 95, 97; 455/405–408
See application file for complete search history.

(56) References Cited

U.S. PATENT DOCUMENTS

| | | | | |
|---|---|---|---|---|
| 7,433,943 B1 * | 10/2008 | Ford | ............... | H04L 12/5695 370/235 |
| 8,797,872 B1 * | 8/2014 | Lambi | ............ | H04N 21/23113 370/230.1 |
| 2005/0041679 A1 * | 2/2005 | Weinstein et al. | ............ | 370/432 |
| 2005/0157751 A1 * | 7/2005 | Rabie | ............... | H04L 12/56 370/466 |
| 2006/0242069 A1 * | 10/2006 | Peterka et al. | ............... | 705/50 |
| 2006/0271972 A1 * | 11/2006 | Pai | ............... | H04N 7/17327 725/86 |
| 2008/0155613 A1 * | 6/2008 | Benya et al. | ............... | 725/89 |
| 2008/0255944 A1 * | 10/2008 | Shah et al. | ............... | 705/14 |
| 2009/0199287 A1 * | 8/2009 | Vantalon | ............... | G06F 21/10 726/9 |
| 2009/0268614 A1 * | 10/2009 | Tay | ............... | H04L 47/10 370/236 |
| 2009/0285196 A1 * | 11/2009 | Lee et al. | ............... | 370/345 |

(Continued)

OTHER PUBLICATIONS

Shalunov, Draft-shalunoz-ledbat-congestion, Mar. 4, 2009.*

(Continued)

*Primary Examiner* — Brian T Pendleton
*Assistant Examiner* — Alan Luong

(57) ABSTRACT

One or more devices, in a video content delivery network, store video content for one or more customer premise devices in a hierarchical storage, and provide real time video content from the hierarchical storage, via multicast or unicast, to the one or more customer premise devices. The one or more devices also provide non-real time video content from the hierarchical storage to the one or more customer premise devices during idle time periods associated with the network. The one or more devices further establish a license with the one or more customer premise devices to view video content in multiple formats, and establish a license with the one or more customer premise devices to view video content via multiple customer premise devices.

19 Claims, 11 Drawing Sheets

(56) References Cited

U.S. PATENT DOCUMENTS

| | | |
|---|---|---|
| 2010/0027966 A1 | 2/2010 | Harrang et al. |
| 2010/0031299 A1 | 2/2010 | Harrang et al. |
| 2010/0063989 A1* | 3/2010 | Mehta et al. ............... 709/202 |
| 2010/0064332 A1* | 3/2010 | Krikorian et al. ........... 725/110 |
| 2010/0070628 A1 | 3/2010 | Harrang et al. |
| 2010/0121941 A1 | 5/2010 | Harrang et al. |
| 2010/0125672 A1* | 5/2010 | Mobin ................ H04N 7/165 709/231 |
| 2010/0131385 A1 | 5/2010 | Harrang et al. |
| 2010/0153410 A1* | 6/2010 | Jin et al. ..................... 707/758 |
| 2010/0251313 A1* | 9/2010 | Mao .................. H04N 21/222 725/98 |
| 2011/0131618 A1* | 6/2011 | Hasek ............................ 725/89 |
| 2012/0016986 A1* | 1/2012 | Jacquet ................. H04L 47/10 709/224 |
| 2012/0239819 A1* | 9/2012 | Winter et al. ................ 709/228 |

OTHER PUBLICATIONS

David W. Brubeck and Lawrence A. Rowe "Hierachical Storage Management in a Distributed VOD system", Jan. 9, 1996, pp. 37-47, IEEE 1996.*

* cited by examiner

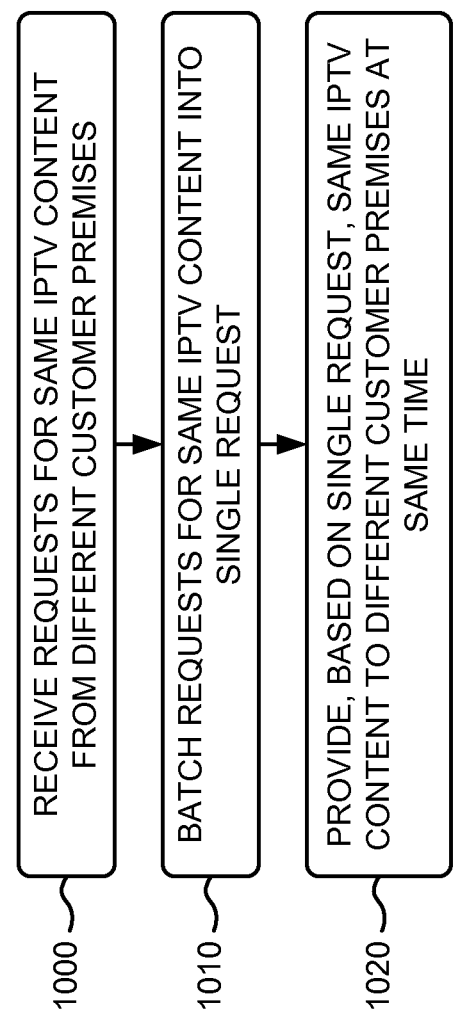

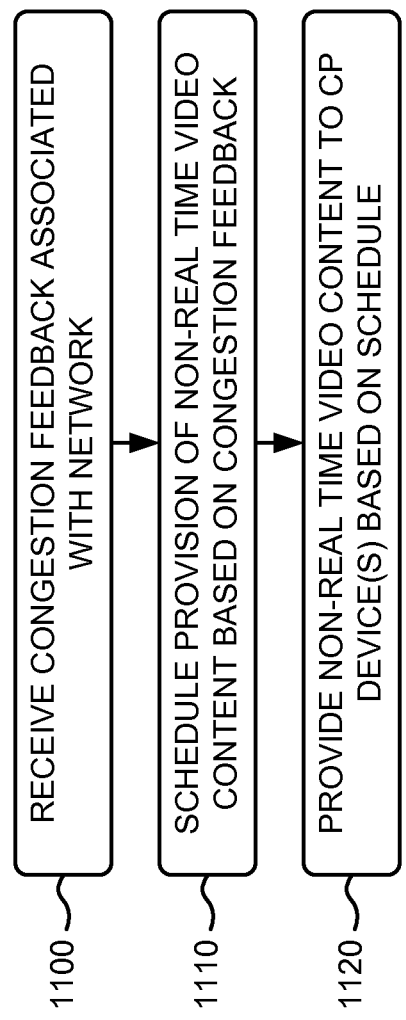

HYBRID VIDEO SELECTION, DELIVERY, AND CACHING

BACKGROUND

Video content (e.g., television shows, pay-per-view (PPV) content, video-on-demand (VOD) content, etc.) may be delivered and selected in several ways. For example, television channels may be broadcast to subscribers' homes and a channel may be viewed via subscriber selection from a channel lineup. Time shifted Internet protocol (IP) television (IPTV) emulates this broadcast delivery over IP, which overcomes bottlenecks associated with lower speed access networks (e.g., twisted pair, digital subscriber line (DSL), wireless, etc. networks) by sending content during time periods when there is spare capacity, or sending content at a rate slower than the playback rate as constrained by an access network bandwidth.

However, IPTV provides a large number of channels that make user selection difficult. Digital video recorders (DVRs) may be used to record video content so that the video content may be viewed at a later time. DVR-based recording, however, is largely limited to tuning to a particular channel (e.g., from a channel lineup), and selecting a time period for recording the particular channel.

Over the top (OTT), or IP unicast, delivery of video content may provide video content to any connected device (e.g., televisions, computers, gaming consoles, smart phones, etc.). OTT video content may include, for example, pre-recorded video content (e.g., television episodes), and content associated with video portals provided by content providers, such as Hulu™, YouTube™, CNN, etc. OTT delivery provides near real time transmission (e.g., with an adaptive transmission rate) of video content, with limited buffering. Furthermore, video content requests are directed to content servers in order to optimize criteria or meet constraints associated with the video content requests. The content servers may optimize the requests' criteria or meet constraints based on performance (e.g., latency), minimum topology hops, historical server load (e.g., sessions, throughput, etc.), economic cost, etc. Content delivery networks (CDNs) may use a variety of mechanisms to determine optimality and/or constraints associated with video content requests. For example, CDNs may configure and transfer address assignments into CDN trackers; may configure domain name system (DNS) redirection; may use load balancers to distribute traffic between servers in a site or between sites; may use quasi-static application layer traffic optimization and pay for performance (P4P) approaches to provide feedback; and may use heuristic algorithms.

However, OTT delivery of video content over a routed network can make use of only limited topology and load information and must convey the content at the playback rate in near real time and only at the requested rate and quality. Furthermore, OTT delivery requires manual (or operations support systems (OSS) application-based) configuration of consistent information in multiple servers. Thus, true optimization is difficult to achieve in OTT delivery of video content and OTT delivery may create network congestion and/or additional operator expense to provision the network for peak load.

BRIEF DESCRIPTION OF THE DRAWINGS

FIGS. 8-11 are flow charts of an example process for providing hybrid video selection, delivery, and caching according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide hybrid video content selection, delivery, and caching. For example, the systems and/or methods may provide a range of selection, subscription, and search mechanisms for video content, may provide multiple delivery methodologies for video content, and may provide efficient hierarchical cache (or storage) of video content.

In one example implementation, the systems and/or methods may be implemented in a network that delivers video content. The systems and/or methods may store video content for customer premise device(s) in a hierarchical storage, and may provide IPTV content from the storage, via real time multicast, to the customer premise device(s). The systems and/or methods may provide VOD content from the storage, via real time unicast, to the customer premise device(s), and may provide non-real time video content, from the storage, to the customer premise device(s) during idle time periods of the network. The systems and/or methods may establish a license with the customer premise device(s) to view video content in multiple formats and/or via multiple devices, and may receive, from a particular customer premise device and based on the license, a request to change a format of video content or to change a device for viewing the video content. Depending on the request, the systems and/or methods may provide, to the particular customer premise device, the requested format of the video content, or may enable the video content to be viewed by another customer premise device.

As used herein, the terms "subscriber," "customer," and/or "user" may be used interchangeably. Also, the terms "subscriber," "customer," and/or "user" are intended to be broadly interpreted to include a user device (e.g., a mobile telephone, a personal computer, a set-top box, a television, etc.) or a user of a user device.

Figure 1:
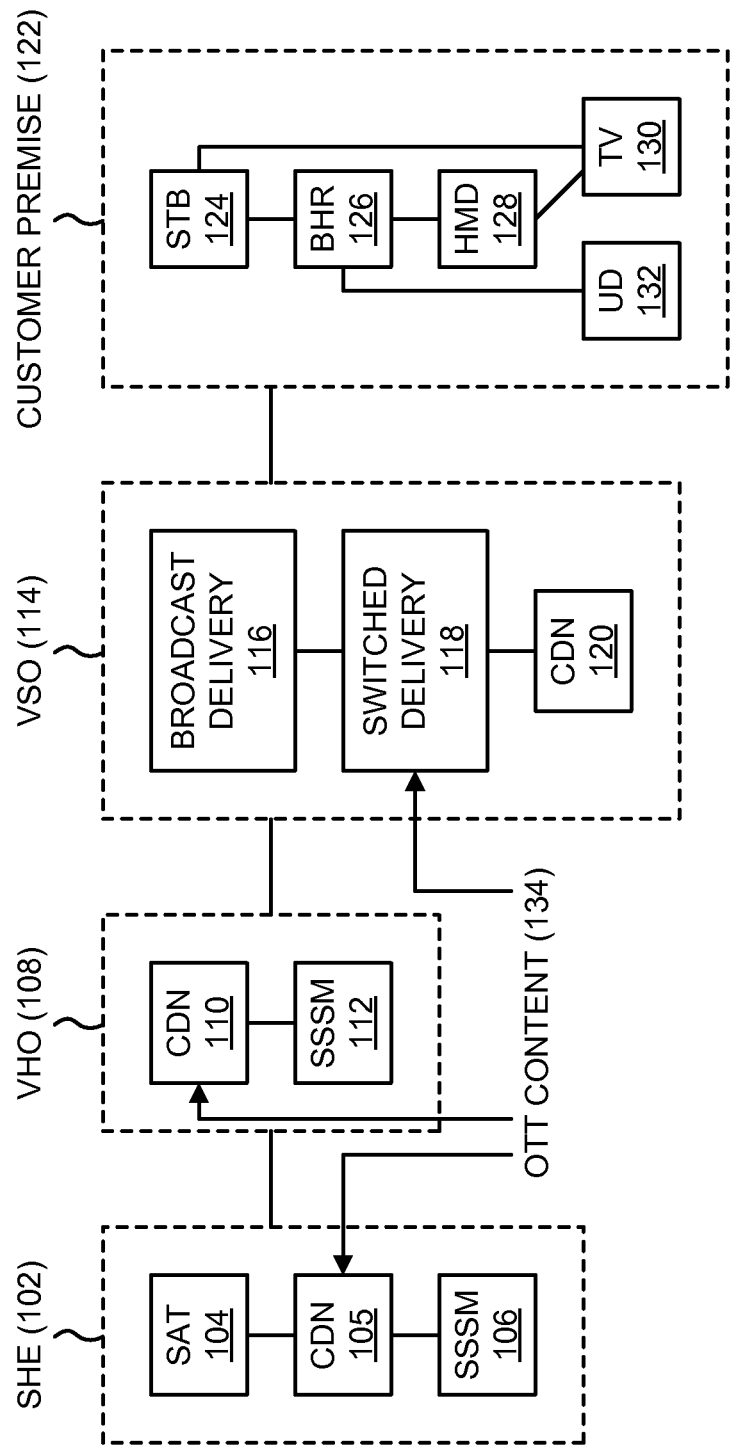
FIG. 1 is a diagram of an example network in which systems and/or methods described herein may be implemented.

FIG. 1 is a diagram of an example network 100 in which systems and/or methods described herein may be implemented. As illustrated, network 100 may include a super head end (SHE) 102 that includes a satellite dish (SAT) 104, content delivery network (CDN) storage 105, and a subscription/selection/search management (SSSM) server 106; a video hub office (VHO) 108 that includes CDN storage 110 and a SSSM server 112; a video serving office (VSO) 114 that includes a broadcast delivery system 116, a switched delivery system 118, and CDN storage 120; a customer premise 122 that includes a STB 124, a broadband home router (BHR) 126, a home media device (HMD) 128, a television (TV) 130, and a user device (UD) 132.

Components of network 100 may interconnect via wired and/or wireless connections. The lines shown between components of network 100 represent example connections. However, components of network 100 may connect to one or more other components of network 100 even if a line showing a connection is not depicted in FIG. 1. Single components and/or networks have been illustrated in FIG. 1 for simplicity. In practice, there may be more components and/or networks than depicted in FIG. 1.

SHE 102 may include one or more server devices (e.g., a top level of CDN or cache hierarchy), or other types of computation or communication devices, that gather, process, search, and/or provide information in a manner described herein. In one implementation, SHE 102 may include a computer system, applications, a cable head-end, and/or broadcasting devices capable of providing video content (e.g., VOD content, high definition (HD)-VOD content, TV programming, movies, on-demand services, live television, IPTV, etc.), commercials, advertisements, instructions, voice content (e.g., voice over IP (VoIP)), and/or other information to customer premises equipment (CPE). In one example, SHE 102 may include a television media reception, processing, and distribution system that selects, combines, and transmits the video content (e.g., VOD, IPTV, etc.) to other headend distribution systems.

Satellite dish 104 may include a parabolic antenna (or other types of antennas) designed to receive microwaves from communications satellites, which transmit data transmissions or broadcasts, such as satellite television, VOD content, etc.

CDN storage 105 may include a random access memory (RAM) or another type of dynamic storage device that stores information and instructions, a read only memory (ROM) or another type of static storage device that stores static information and instructions, and/or some other type of magnetic or optical recording medium and its corresponding drive for storing information and/or instructions. In one example implementation, CDN storage 105 may receive non-real time video content (e.g., OTT video content, pre-recorded video content, previous episodes, media-oriented advertisements, etc.), and may provide the non-real time video content to CDN storage 110.

SSSM server 106 may include one or more server devices, or other types of computation or communication devices, that gather, process, search, and/or provide information in a manner described herein. In one implementation, SSSM server 106 may include one or more server devices that enable the scheduling and coordinating of under-the-bottom time-shifted distribution of non-real time video content (e.g., OTT video content, pre-recorded video content, previous episodes, media-oriented advertisements, etc.) during idle time periods of network 100 (e.g., at night, during low traffic, etc.). In one example, SSSM server 106 may instruct CDN storage 105 to provide such non-real time video content to CDN storage 110, and SSSM server 112 may instruct CDN storage 110 to forward the non-real time video content to switched delivery system 118, CDN storage 120, and/or HMD 128. The non-real time video content may be provided "under-the-bottom" of network 100 since the content is provided when network 100 is not experiencing congestion. In contrast, and as described above, OTT delivery of video content may create network congestion.

VHO 108 may include one or more server devices, or other types of computation or communication devices, that gather, process, search, and/or provide information in a manner described herein. In one implementation, VHO 108 may include a computer system, applications, and/or broadcasting devices capable of providing video content to a regional location. A regional VHO 108 may serve a local VSO (e.g., VSO 114), and the local VSO may provide the video content to customer premises equipment.

CDN storage 110 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, CDN storage 110 may receive VOD content from satellite dish 104, and may provide the VOD content to broadcast delivery system 116 and/or switched delivery system 118. In another example implementation, CDN storage 110 may receive non-real time video content from CDN storage 105, and may provide the non-real time video content to switched delivery system 118, CDN storage 120, and/or HMD 128.

SSSM server 112 may include one or more server devices, or other types of computation or communication devices, that gather, process, search, and/or provide information in a manner described herein. In one implementation, SSSM server 112 may include one or more server devices that provide under-the-bottom time-shifted distribution of non-real time video content during idle time periods of network 100. In one example, SSSM server 112 may instruct CDN storage 110 to provide such non-real time video content to switched delivery system 118, CDN storage 120, and/or HMD 128. The non-real time video content may be provided "under-the-bottom" of network 100 since the content is provided when network 100 is not experiencing congestion.

VSO 114 may include one or more server devices, or other types of computation or communication devices, that gather, process, search, and/or provide information in a manner described herein. In one implementation, VSO 114 may include a computer system, applications, and/or broadcasting devices capable of receiving video content from a regional VHO (e.g., VHO 108), and providing the video content to customer premises equipment (e.g., to STB 124, BHR 126, etc.).

Broadcast delivery system 116 may include one or more server devices, or other types of computation or communication devices, that gather, process, search, and/or provide information in a manner described herein. In one implementation, broadcast delivery system 116 may include a computer system, applications, and/or broadcasting devices capable of receiving broadcast television content from satellite dish 104, and providing the broadcast television content to STB 124. Broadcast delivery system 116 may also provide IPTV content (e.g., received from satellite dish 104) to switched delivery system 118, and switched delivery system 118 may provide the IPTV content to BHR 126.

Switched delivery system 118 may include one or more server devices, or other types of computation or communication devices, that gather, process, search, and/or provide information in a manner described herein. In one implementation, switched delivery system 118 may include a network of devices capable of receiving VOD content and non-real time video content from CDN storage 110, receiving IPTV content from broadcast delivery system 116, and receiving non-real time video content from CDN storage 120. Switched delivery system 118 may provide the VOD content, the IPTV content, and/or the non-real time video content to BHR 126. Switched delivery system 118 may provide unicast or multicast content. Multicast content may require scheduling by SSSM servers 106/112 to optimize delivery of content to a large number of HMDs 128 (e.g., selecting and subscribing to popular content). Any portions of content dropped during multicast transmission (e.g., due to bit errors or packet loss) can be resent via unicast transmission. Furthermore, if some HMDs 128 are off line (e.g., due to a power or network outage), such HMDs 128 may be "caught up" via unicast transmission.

CDN storage 120 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, CDN storage 120 may store non-real time video content received from CDN storage 110, and may provide the non-real time video content to switched delivery system 118.

Customer premise 122 may include a subscriber's premises (e.g., a home) and the associated equipment connected with a service provider (e.g., a carrier's telecommunication equipment).

STB 124 may include a device that receives and/or processes video content, and provides the video content to television 130 or another device. STB 124 may also include decoding and/or decryption capabilities and may further include a digital video recorder (DVR) (e.g., a hard drive). In one example implementation, STB 124 may be incorporated directly within television 130. In another implementation, STB 124 and/or television 130 may be replaced with a computing device (e.g., a personal computer, a laptop computer, a tablet computer, etc.), a cable card, a TV tuner card, or a portable communication device (e.g., a mobile telephone or a PDA). In one example, STB 124 may receive video content (e.g., broadcast television content, IPTV content, VOD content, etc.) from broadcast delivery system 116 and/or BHR 126, and may provide the video content to television 130 for display.

BHR 126 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, BHR 126 may be physically deployed with a satellite antenna (e.g., on a roof or a side wall of a house associated with customer premise 122). BHR 126 may support sharing of cable modem or Internet connections, and may include various network security features like firewall capability. In one example, BHR 126 may receive video content (e.g., IPTV content or VOD content) from switched delivery system 118, and may provide the video content to STB 124. In another example, BHR 126 may receive real time and/or non-real time video content from switched delivery system 118 and/or HMD 128, and may provide the real time and/or non-real time video content to television 130 and/or to user device 132.

HMD 128 may include a RAM or another type of dynamic storage device that stores information and instructions, a ROM or another type of static storage device that stores static information and instructions, and/or some other type of magnetic or optical recording medium and its corresponding drive for storing information and/or instructions. In one example implementation, HMD 128 may provide storage for non-real time video content (e.g., received from CDN storage 110 during idle time periods or network 100), and may provide the non-real time video content to BHR 126 when user device 132 requests the non-real time video content.

Television 130 may include a television monitor that is capable of displaying video content, television programming, content provided by STB 124, and/or content provided by other devices (e.g., a digital video disk (DVD) player, a video camera, etc., not shown) connected to television 130.

User device 132 may include any device that is capable of communicating with BHR 126 (e.g., to reach other functions in network 100, such as SSSM servers 106/112) in order to, for example, request and/or receive video content. For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a customer's home) computation and/or communication device, such as a laptop computer, a personal computer, a tablet computer, a television, a gaming system, etc.

As further shown in FIG. 1, OTT content 134 may be provided to CDN storage 105 (e.g., which may be controlled by SSSM server 106), CDN storage 110 (e.g., which may be controlled by SSSM server 112), and/or switched delivery system 118. OTT content 134 may include, for example, pre-recorded video content (e.g., television episodes); content associated with video portals provided by content providers, such as Hulu™, YouTube, CNN, etc.; video content delivered over an alternative means (e.g., the Internet) rather than a main video delivery infrastructure (e.g., a cable television infrastructure); etc.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
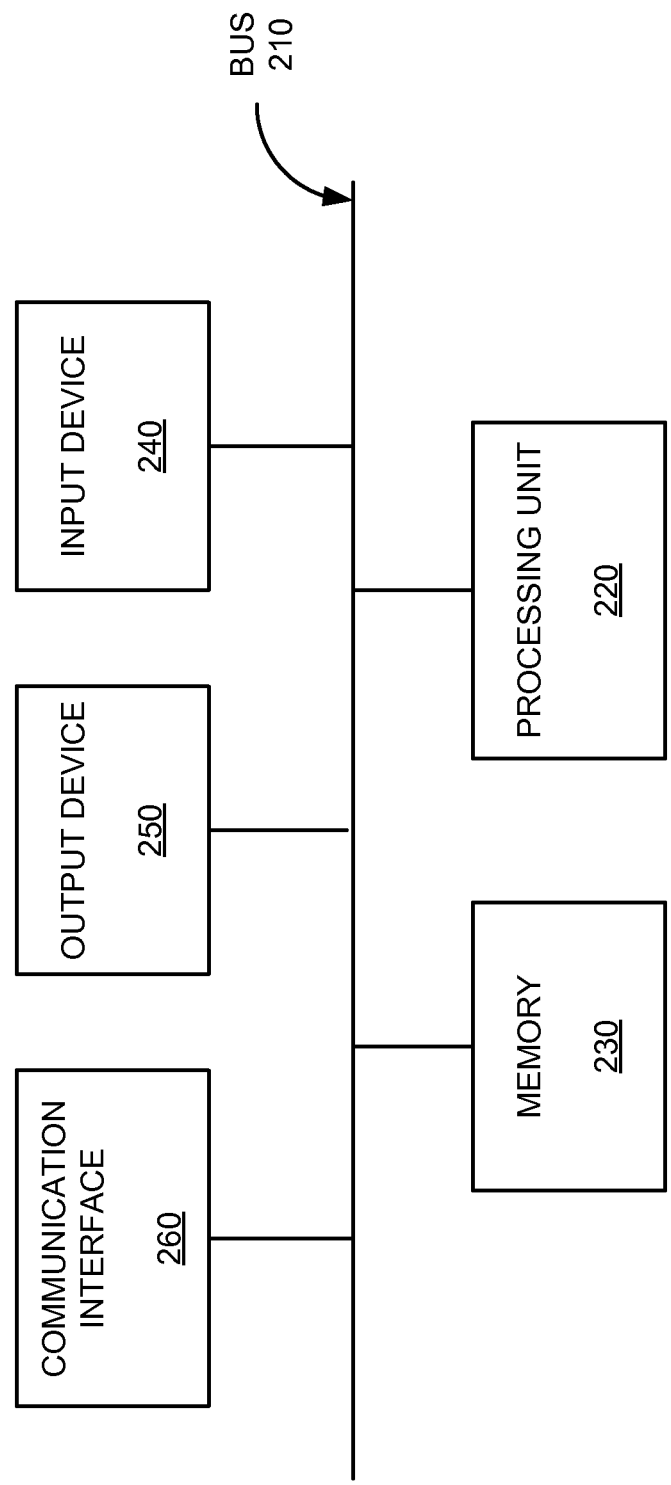
FIG. 2 is a diagram of example components of one or more of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
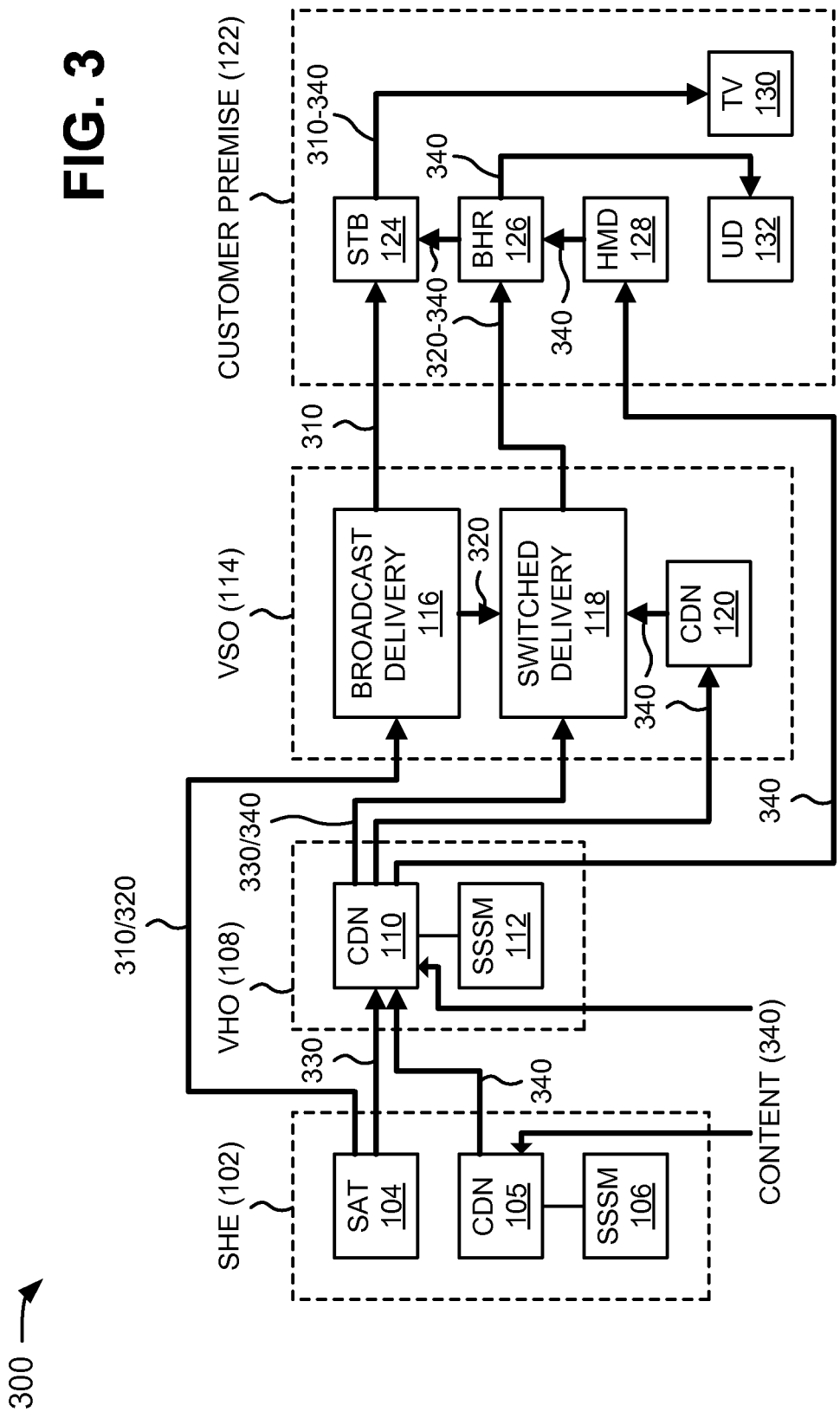
FIG. 3 is a diagram of example interactions between components of an example portion of the network depicted in FIG. 1.

FIG. 3 is a diagram of example interactions between components of an example portion 300 of network 100. As illustrated, example network portion 300 may include SHE 102, satellite dish 104, CDN storage 105, SSSM server 106, VHO 108, CDN storage 110, SSSM server 112, VSO 114, broadcast delivery system 116, switched delivery system 118, CDN storage 120, customer premise 122, STB 124, BHR 126, HMD 128, television (TV) 130, and user device (UD) 132. In one implementation, the components depicted in network portion 300 may include the features described above in connection with one or more of FIGS. 1 and 2.

As further shown in FIG. 3, satellite dish 104 may receive video content 310 (e.g., via reception of satellite transmissions), and may provide video content 310 to broadcast delivery system 116. In one example, video content 310 may include content adhering to quadrature amplitude modulation (QAM) broadcast standards, such as broadcast television. Broadcast delivery system 116 may provide video content 310 to STB 124, and STB 124 may provide video content 310 to television 130. Television 130 may receive video content 310 and may display video content 310 (e.g., to a user).

Satellite dish 104 may receive video content 320 (e.g., via reception of satellite transmissions), and may provide video content 320 to broadcast delivery system 116. In one example, video content 320 may include real time (RT) multicast video content, such as broadcast long-tail IPTV content. Broadcast delivery system 116 may provide video content 320 to switched delivery system 118, switched delivery system 118 may provide video content 320 to BHR 126, and BHR 126 may provide video content 320 to STB 124. STB 124 may provide video content 320 to television 130, and television 130 may display video content 320 (e.g., to a user).

Satellite dish 104 may receive video content 330 (e.g., via reception of satellite transmissions), and may provide video content 330 to CDN storage 110. In one example, video content 330 may include real time (RT) unicast video content, such as VOD content. CDN storage 110 may provide video content 330 to switched delivery system 118, switched delivery system 118 may provide video content 330 to BHR 126, and BHR 126 may provide video content 330 to STB 124. STB 124 may provide video content 330 to television 130, and television 130 may display video content 330 (e.g., to a user).

As further shown in FIG. 3, video content 340 may be provided to CDN storage 105 and/or to CDN storage 110 (e.g., from content providers, not shown). In one example, video content 340 may include best effort (BE) (or higher priority) unicast video content (e.g., OTT content 134), tower effort (LE) (or lower priority) multicast video content, and/or LE unicast video content. In one example implementation, video content 340 may include non-real time video content that is to be delivered during idle time periods of network 100. SSSM server 106 may instruct CDN 105 to provide video content 340 to CDN storage 110. SSSM server 112 may instruct CDN storage 110 to provide video content 340 to switch delivery system 118, CDN storage 120, and/or HMD 128. CDN storage 120 may provide video content 340 to switched delivery system 118. Switched delivery system 118 may provide video content 340 to BHR 126, and BHR 126 may provide video content 340 to STB 124 and/or user device 132 (e.g., for display to a user). STB 124 may provide video content 340 to television 130, and television 130 may display video content 340 (e.g., to a user). HMD 128 may store video content 340 for later retrieval by BHR 126. BHR 126 may retrieve video content 340 from HMD 128, and may provide video content 340 to STB 124. STB 124 may provide video content 340 to television 130, and television 130 may display video content 340 (e.g., to a user). HMD 128 may provide video content 340 to television 130 and/or user device 132 in real time and in a manner that provides security for video content 340.

As described above, network portion 300 may utilize under-the-bottom lower effort (LE) IP transport for non-real time video content 340, and may transmit non-real time video content 340 during idle time periods of network portion 300. During the idle time periods, network portion 300 may have significant capacity available for provision (or transmission) of non-real time video content 340. The non-real time video content 340 may be broadcast, in real time, at customer premise 122 (e.g., the next day). In one implementation, if network portion 300 detects network congestion (e.g., using a congestion notification), network portion 300 may reduce or cease provision (or transmission) of non-real time video content 340.

The under-the-bottom delivery of non-real time video content 340 may make better use of existing resources in network portion 300. In one example implementation, network portion 300 may charge for the amount of non-real time video content 340 that is transported (rather than how quickly it is transported), and may schedule delivery of non-real time video content 340 to maximize for off-peak network utilization and/or charges less for this (e.g., which may be important in lower bandwidth networks).

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
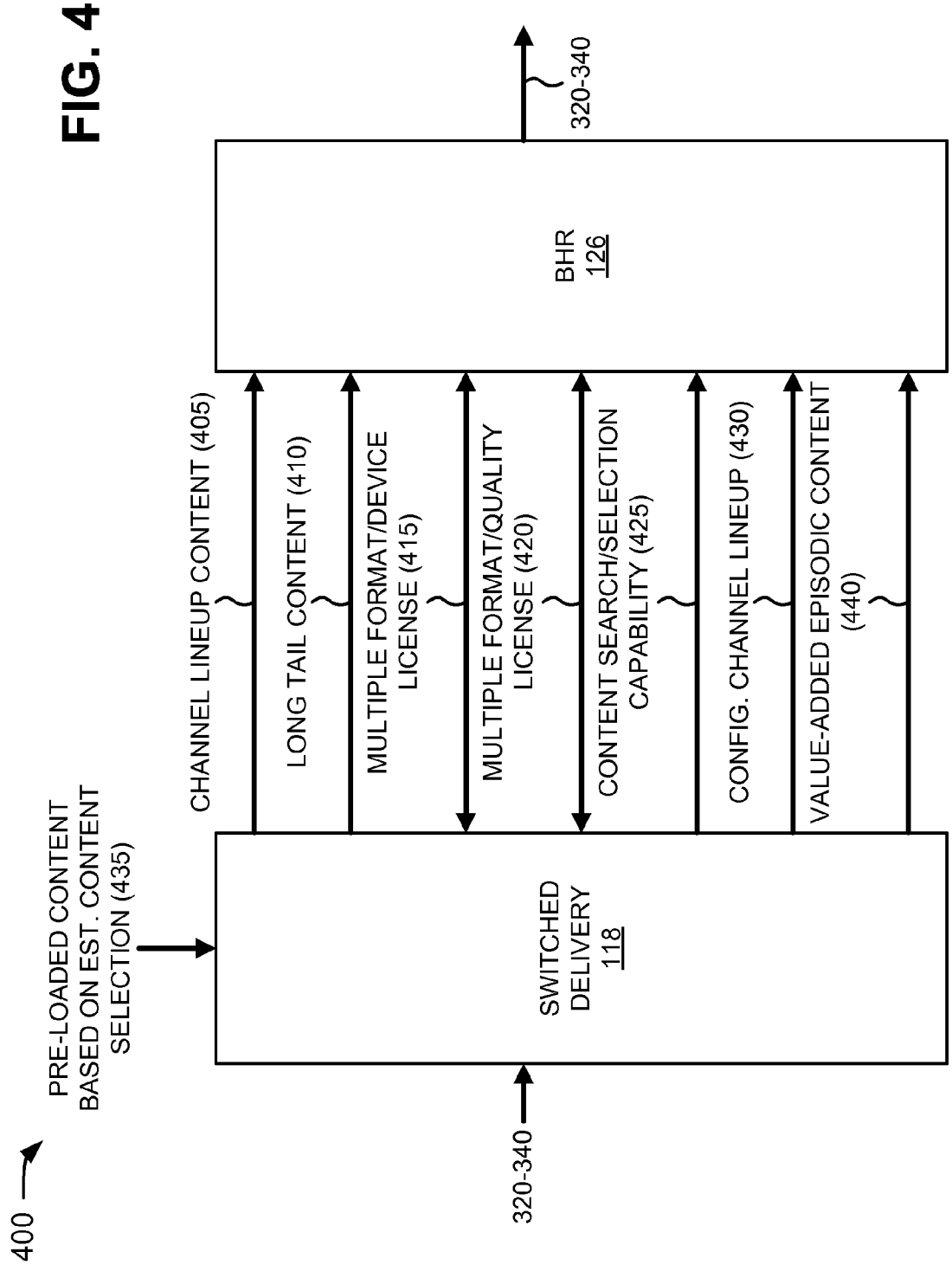
FIG. 4 is a diagram of example interactions between components of another example portion of the network depicted in FIG. 1.

FIG. 4 is a diagram of example interactions between components of another example portion 400 of network 100. As illustrated, example network portion 400 may include switched delivery system 118 and BHR 126. In one implementation, switched delivery system 118 and BHR 126 may include the features described above in connection with one or more of FIGS. 1-3.

In one example implementation, network portion 400 may provide a range of video content selection, subscription, and search mechanisms. In other implementations, such video content selection, subscription, and search mechanisms may be provided by one or more other components of network 100, such as, for example, SSSM server 106 and/or SSSM server 112.

As shown in FIG. 4, switched delivery system 118 may receive video content 320-340, and may provide video content 320-340 to BHR 126 via the selection, subscription, and search mechanisms. BHR 126, in turn, may provide video content 320-340 to customer premise 122 (not shown). In one example, switched delivery system 118 may provide channel lineup content 405, created by SSSM server 112, to devices attached to BHR 126. Channel lineup content 405 may include broadcast television, cable television, popular video content, traditional video content, etc. In another example, channel lineup content 405 may be provided to STB 124 (not shown), via video content 310. Switched delivery system 118 may also provide long tail IPTV content 410 to devices attached to BHR 126. In one example, long tail IPTV content 410 may include real time (RT) multicast video content, such as broadcast long-tail IPTV content or broadcast television content (e.g., video content 320). In another example, long tail IPTV content 410 may include subscription-based long tail, least popular video content.

As further shown in FIG. 4, a multiple format/device license 415 may be exchanged between SSSM server 112, via switched delivery system 118, and one or more devices attached to BHR 126. Multiple format/device license 415 may enable users associated with the customer premise to view video content on multiple customer premise devices (e.g., STB 124, television 130, and/or user device 132) and in multiple formats (e.g., high definition, three-dimensional, etc.). In one example, multiple format/device license 415 may enable a user to begin video content on one device (e.g., television 130) and to pause, stop, and/or resume the video content on another device (e.g., user device 132).

A multiple format/quality license 420 may be exchanged between SSSM server 112, via switched delivery system 118, and BHR 126 attached devices. Multiple format/quality license 420 may enable users associated with customer premise 122 to view video content in multiple formats (e.g., high definition, three-dimensional, etc.) and with different qualities on the same customer premise device (e.g., STB 124, television 130, and/or user device 132). In one example, multiple format/quality license 420 may enable a user to dynamically change the format and/or quality of video content (e.g., switch between a high definition mode and a regular mode). In another example, multiple format/quality license 420 may enable switched delivery system 118 to simultaneously send multiple format/quality video content to BHR 126.

As further shown in FIG. 4, switched delivery system 118 (e.g., via interaction with SSSM server 112) may provide a content search/selection capability 425 to BHR 126 attached devices. In one implementation, content search/selection capability 425 may enable users associated with customer premise 122 to search and select non-real time video content (e.g., video content 340) via interaction with SSSM server 112. Switched delivery system 118 (e.g., via interaction with SSSM server 112) may also enable users (e.g., associated with customer premise 122) to configure channel lineup content (e.g., channel lineup content 405), as indicated by reference number 430. In one implementation, switched delivery system 118 may estimate content selection per delivery point (e.g., per customer premise) based on historical information of selected video content, and may receive pre-loaded video content based on the estimated content selection, as indicated by reference number 435. For example, if customer premise 122 consistently views high definition (HD) sports channels, switched delivery system 118 may receive such HD sports channels prior to customer premise 122 selecting the HD sports channels. This may enable switched delivery system 118 to quickly provide the HD sports channels to customer premise 122 when selected.

In one implementation, switched delivery system 118 (e.g., via interaction with SSSM server 112) may provide value-added episodic video content 440 to BHR 126 attached devices. For example, if video content is being efficiently broadcast to BHR 126, then switched delivery system 118 may add value to the video content (e.g., by charging an extra fee for no advertisements, by providing targeted advertising to users, by providing access to previous episodes, by providing video content recaps or previews, etc.). In another example, such value-added services may be extended to non-broadcast video content.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
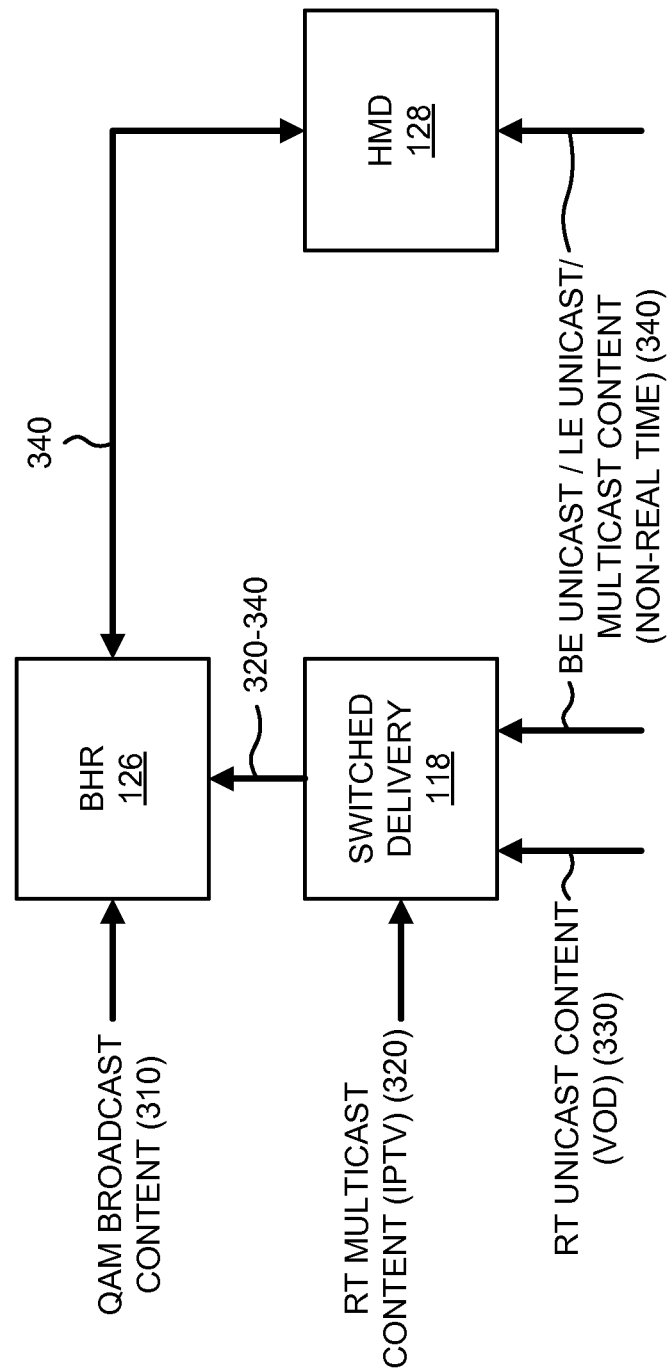
FIG. 5 is a diagram of example interactions between components of still another example portion of the network depicted in FIG. 1.

FIG. 5 is a diagram of example interactions between components of still another example portion 500 of network 100. As illustrated, example network portion 500 may include switched delivery system 118, BHR 126, and HMD 128. In one implementation, switched delivery system 118, BHR 126, and HMD 128 may include the features described above in connection with one or more of FIGS. 1-4.

In one implementation, network portion 500 may depict multiple video content delivery methods according to implementations described herein. Network portion 500 may obtain the video content depicted in FIG. 5 from the hierarchical storage scheme depicted in FIG. 6. For example, IPTV content (e.g., video content 320) may be provided to switched delivery system 118 via real time multicast. As further shown in FIG. 5, VOD content (e.g., video content 330) may be provided to switched delivery system 118 via real time unicast.

Best effort (BE) unicast may be used for delivery of non-real time video content (e.g., video content 340) to switched delivery system 118, and lower effort (LE) unicast and/or multicast may be used for delivery of non-real time video content (e.g., video content 340) to HMD 128. In one implementation, video content 340 may be transferred using larger buffers than typical buffers in order to provide faster download of video content 340. In another implementation, video content 340 may be pre-delivered so that video content 340 may be viewed via a channel selection mode. In one example, non-real time video content 340 may be provided during idle network times and may use low bandwidth access links (e.g., wireless access), and could use P4P for local redistribution of popular or missed content.

As further shown in FIG. 5, switched delivery system 118 may provide video content 320-340 to BHR 126 e.g., for further distribution to other customer premise devices), and HMD 128 may provide video content 340 to BHR 126 (e.g., for further distribution to other customer premise devices). HMD 128 may also receive video content 340 from BHR 126.

In one example implementation, requests for the same video content (e.g., IPTV content) may be batched together as a single request, and the requested video content (e.g., IPTV content) may be delivered via multicast to many customer premise locations (e.g., to BHR 126, switched delivery system 118, and/or HMD 128) for efficiency. In other implementations, the requested video content may be delivered via unicast for less popular video content, if multicast is unavailable (e.g., due to power/device outages), to respond to spontaneous subscriptions, for infrequent retransmissions, etc. In still another example implementation, a few (X) minutes of video content may be provided, and, if a viewing time (Y minutes) is greater than X minutes (i.e., Y>X), a progressive download mode may be utilized to deliver more of the video content.

As described above, HMD 128 may be deployed at customer premise 122 for storing non-real time video content 340. In one implementation, MAD 128 may store commercials and extended advertising media, and may synchronize this content with times at which the content is to be viewed (e.g., via television 130). HMD 128 may include a new external device, a customer purchased unit, or an add-on appliance provided at customer premise 122. Alternatively, or additionally, non-real time video content 340 may be stored in low cost network-based storage, commercial processors, VSO 114 (e.g., for the most popular content), etc. Local storage of non-real time video content 340 may relieve network portion 500 of quality of service (QoS) requirements for real time delivery. In one example implementation, HMD 128 may be omitted from network portion 500, and non-real time video content 340 may be stored in various devices (e.g., a music player, a DVD player, a television, a computer, etc.) located at customer premise 122, but may be accessed by any other device located at customer premise 122. For example, user device 132 may store non-real time video content 340, and television 130 may retrieve content 340 from user device 132.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

Figure 6:
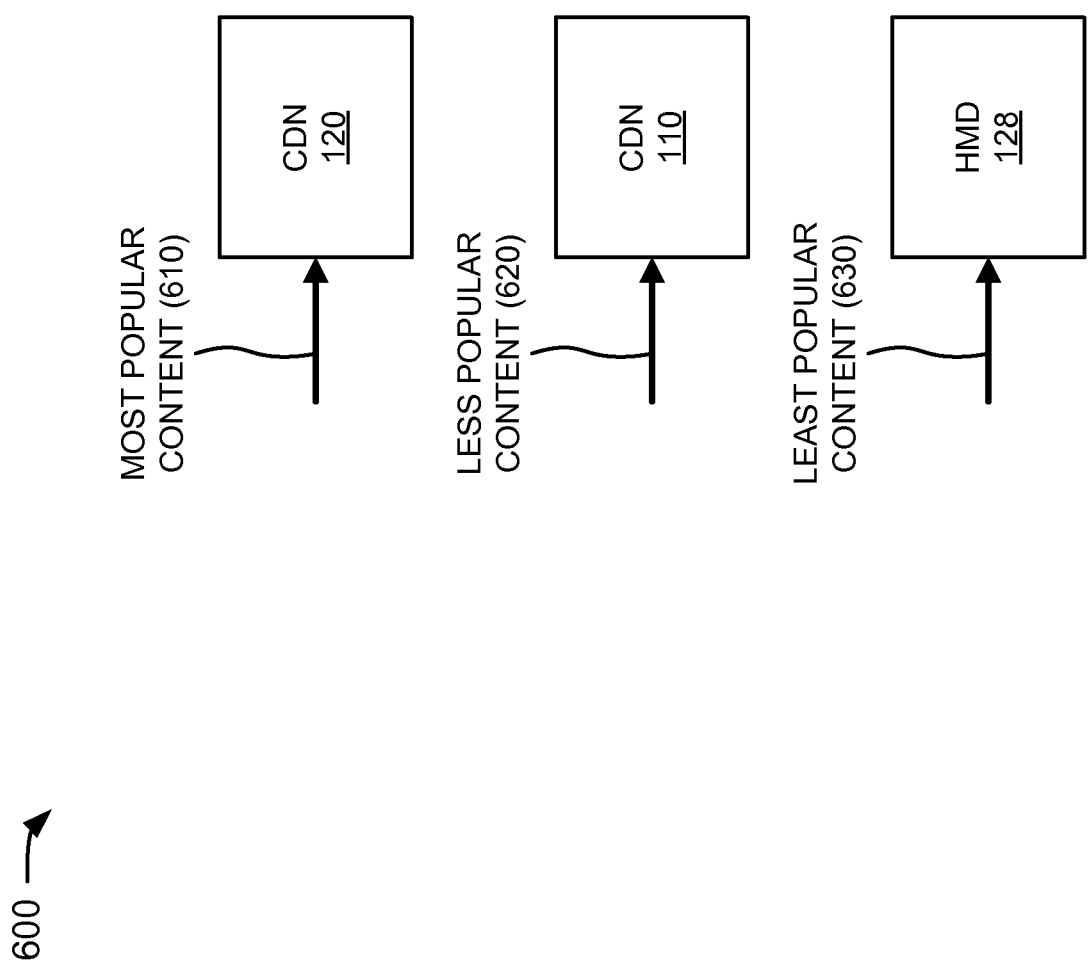
FIG. 6 is a diagram of example interactions between components of a further example portion of the network depicted in FIG. 1.

FIG. 6 is a diagram of example interactions between components of a further example portion 600 of network 100. As illustrated, example network portion 600 may include CDN storage 110 (e.g., provided at VHO 108), CDN storage 120 (e.g., provided at VSO 114), and HMD 128. In one implementation, CDN storage 110, CDN storage 120, and HMD 128 may include the features described above in connection with one or more of FIGS. 1-5.

In one implementation, network portion 600 may depict a hierarchical cache (or storage) of video content. As shown in FIG. 6, the most popular video content 610 (e.g., video content 310 and/or 320) may be cached at VSO 114 (e.g., in CDN storage 120 of VSO 114). Video content 620 (e.g., video content 330) that is less popular than video content 610 may be cached further in network 100, such as at VHO 108 (e.g., in CDN storage 110 of VHO 108). The least popular video content 630 (e.g., video content 340) may be cached at customer premise 122 (e.g., in one or more customer premise devices, such as HMD 128).

In one example implementation, network portion 600 (e.g., state information associated with CDN storage 110, CDN storage 120, and/or HMD 128) may be directly coupled with proximity/load/tracking servers and/or with an access network. For example, instead of using an overlay approach (e.g., as is currently done in content delivery networks), path and state information (e.g., associated with network portion 600) may be directly coupled into a request/response paradigm. Network portion 600 may intercept customer requests for video content, and may (e.g., using state information associated with network portion 600) return an address of a content server in response to the requests.

Although FIG. 6 shows example components of network portion 600, in other implementations, network portion 600 may include fewer components, different components, differently arranged components, and/or additional components than depicted in FIG. 6. Alternatively, or additionally, one or more components of network portion 600 may perform one or more other tasks described as being performed by one or more other components of network portion 600.

Figure 7:
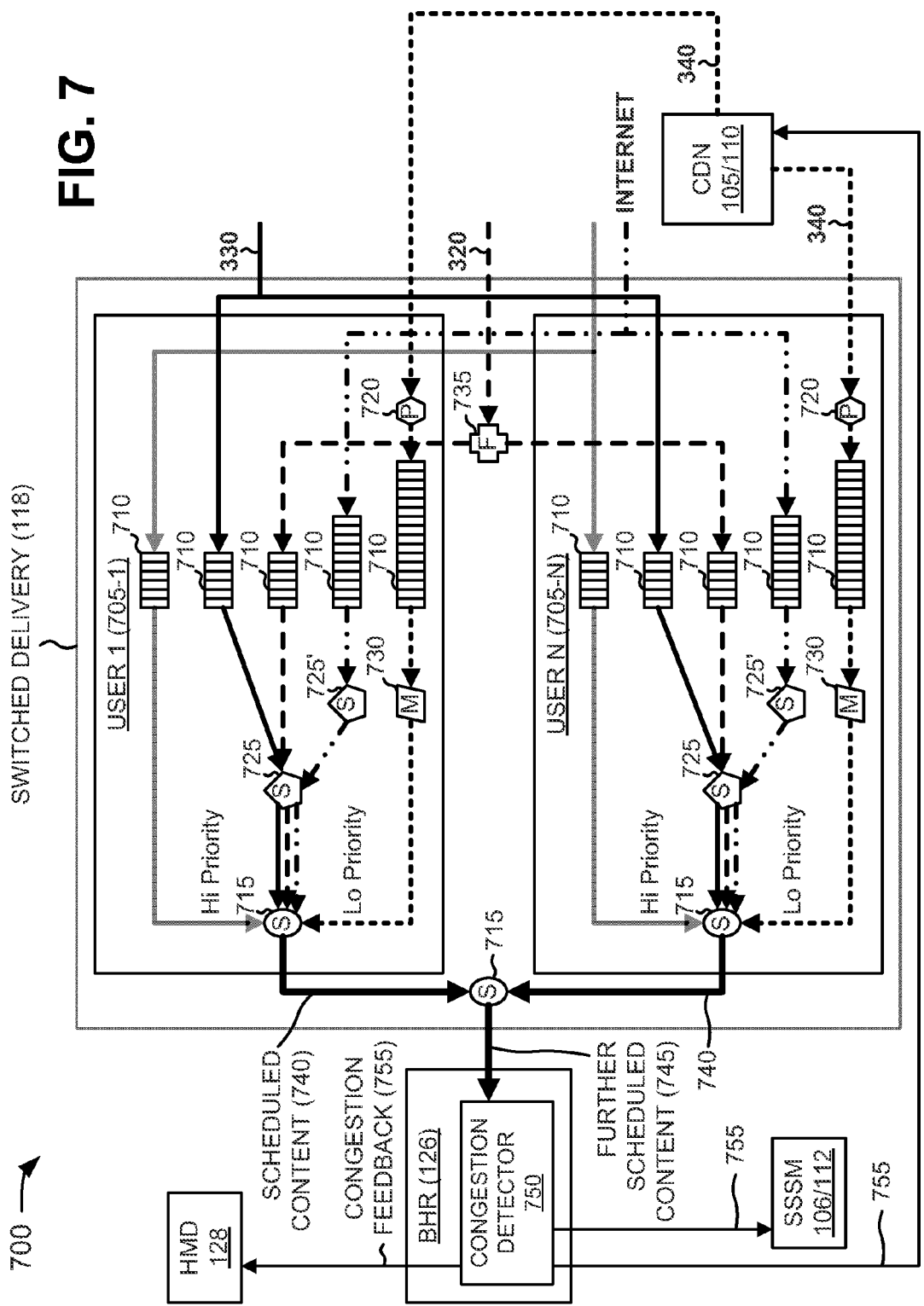
FIG. 7 is a diagram of example functional components of a switched delivery system of the network depicted in FIG. 1.

FIG. 7 is a diagram of example functional components 700 of switched delivery system 118. In one implementation, the functions described in connection with FIG. 7 may be performed by one or more components of device 200 (FIG. 2). As shown in FIG. 7, switched delivery system 118 may include multiple user components 705-1, . . . , 705-N (collectively referred to herein as "user components 705," and singularly as "user component 705") that include admit queues 710, scheduling logic 715, policing logic 720, shaping logic 725, and marking logic 730; and may also include forwarding logic 735.

User component 705 may include hardware or a combination of hardware and software that may receive different types of content (e.g., video content, voice content, data, etc.), and may schedule the different types of content for delivery to a corresponding subscriber (e.g., to a customer premise associated with a subscriber). For example, as shown in FIG. 7, user components 705 may receive video content 320 (e.g., IPTV content), video content 330 (e.g., VOD content), non-real time video content 340 from CDN storage 105/110, voice content (e.g., VoIP content), Internet content (e.g., data), etc.

Admit queues 710 may include hardware or a combination of hardware and software that may receive and store the different types of content in a particular order. In one implementation, admit queues 710 may be used to prioritize the different types of content (e.g., low priority, high priority, etc.) so that the different types of content may be scheduled for delivery to a corresponding subscriber.

Scheduling logic 715 may include hardware or a combination of hardware and software that may receive the different types of content (e.g., as prioritized by admit queues 710), and may schedule the content for delivery to a corresponding subscriber.

Policing logic 720 may include hardware or a combination of hardware and software that may provide network security features (e.g., filtering, firewall capability, etc.) for the different types of content.

Shaping logic 725 may include hardware or a combination of hardware and software that may receive the different types of content and may apply traffic shaping to the content. For example, shaping logic 725 may apply traffic shaping to the content in order to optimize or guarantee performance of the content, improve latency, and/or increase usable bandwidth (e.g., by delaying content that meets certain criteria).

Marking logic 730 may include hardware or a combination of hardware and software that may apply traffic marking to the different types of content. Marking the different types of content may enable attributes for the content (e.g., belonging to a specific class or category) to be set or modified.

Forwarding logic 735 may include hardware or a combination of hardware and software that may receive a particular one of the different types of content, and may provide multicast replication for the particular content.

As further shown in FIG. 7, the voice content may be provided to first admit queues 710 (e.g., the first from the top), and the first admit queues 710 may forward the voice content to scheduling logic 715. Video content 330 (e.g., VOD content) may be provided to second admit queues 710 (e.g., the second from the top), and the second admit queues 710 may provide video content 330 to a first shaping logic 725. Video content 320 (e.g., IPTV content) may be provided to forwarding logic 735, and forwarding logic 735 may provide video content 320 to third admit queues 710 (e.g., the third from the top). The third admit queues 710 may provide video content 320 to the first shaping logic 725. The Internet content may be provided to fourth admit queues 710 (e.g., the fourth from the top), and the fourth admit queues 710 may provide the Internet content to a second shaping logic 725 (e.g., for traffic shaping). The second shaping logic 725' may provide the shaped Internet content to the first shaping logic 725. CDN storage 105/110 may provide video content 340 (e.g., non-real time video content) to policing logic 720 (e.g., for filtering), and policing logic 720 may provide the filtered video content 340 to fifth admit queues 710 (e.g., the fifth from the top). The fifth admit queues 710 may provide the filtered video content 340 to marking logic 730 (e.g., for traffic marking), and marking logic 730 may provide the filtered/marked video content 340 to scheduling logic 715.

The first shaping logic 725 may receive video content 320/330 and the Internet content, and may apply traffic shaping to video content 320/330 and the Internet content. The first shaping logic 725 may provide the shaped video content 320/330 and Internet content to scheduling logic 715. Each scheduling logic 715 (e.g., of user components 705) may receive video content 320-340, the voice content, and the Internet content, and may schedule the content for ultimate delivery to BHR 126, as indicated by reference number 740. Each scheduling logic 715 may provide scheduled content 740 to another scheduling logic 715 (e.g., of switched delivery system 118), and the other scheduling logic 715 may further schedule content 740 for delivery to BHR 126, as indicated by reference number 745. The other scheduling logic 715 may forward scheduled content 745 to BHR 126 (e.g., pursuant to a schedule determined by the other scheduling logic 715). BHR 126 may forward scheduled content 745 (e.g., pursuant to the schedule) to one or more devices provided at customer premise 122 (e.g., STB 124, HMD 128, user device 132, etc).

As further shown in FIG. 7, BHR 126 may include a congestion detector 750 that may receive scheduled content 745 from the other scheduling logic 715, and may generate congestion feedback information 755 based on scheduled content 745. Congestion feedback information 755 may include information associated with usage (e.g., congested, low traffic, medium traffic, etc.) of network 100. Congestion detector 750 may provide congestion feedback information 755 to SSSM servers 106/112, CDN storage 105/110, and/or HMD 128. In one example implementation, congestion feedback information 755 may be used by SSSM servers 106/112, CDN storage 105/110, and/or HMD 128 to determine when, how much, etc. non-real time video content may be delivered in network 100.

In one implementation, SSSM servers 106/112 may receive congestion feedback information 755, may schedule (e.g., in non-real time) provisioning of non-real time video content 340 based on congestion feedback information 755, and may determine when to forward non-real time video content 340 based on the determined schedule. In one example, if SSSM servers 106/112 detect network congestion (e.g., based on congestion feedback information 755), SSSM servers 106/112 may reduce or cease provisioning of non-real time video content 340 in non-real time, whereas CDN storage 105/110 may do this in near real time. In another example, if SSSM servers 106/112 identify a time period (e.g., from 1:00 AM to 3:00 AM) as a time of little usage of network 100, SSSM servers 106/112 may request provisioning of non-real time video content 340 during this time period.

Congestion detector 750 may implement a variety of congestion control methods (e.g., to generate congestion feedback information 755), such as an explicit congestion notification (ECN) method, a pre-congestion notification (PCN) method, a re-inserted feedback ECN (re-ECN) method, a low extra delay background transport (ledbat) method, etc. In other implementations, congestion detector 750 may utilize congestion control methods that use knowledge of historical traffic patterns and longer term measures of usage (e.g., for SSSM servers 106/112 usage).

In the ECN method, the ECN may be negotiated between network endpoints (e.g., switched delivery system 118 and BHR 126), and an ECN-aware device may set an IP header bit in a packet (e.g., instead of dropping the packet) to signal the beginning of congestion in a network (e.g., network 100). A packet receiver may echo the congestion indication to a packet sender, and the packet sender may react as if the packet was dropped.

In the PCN method, PCN threshold rates may be configured on edge and backbone links in a trusted domain, and a network device (e.g., BHR 126) may compare actual packet rates to the PCN threshold rates, and may mark packets that exceed the PCN threshold rates. A destination network device (e.g., BHR 126) may return congestion feedback (e.g., congestion feedback information 755) to a source network device. The source network device may police traffic based on flow rate, may determine whether new PCN flows can be admitted, may terminate existing PCN flows (e.g., in case of extreme congestion), etc. The re-ECN method may function similar to the PCN method, but in a non-trusted domain rather than in a trusted domain. In the ledbat method, ECN measurements or application layer latency measurements may be used to provide congestion feedback to "bandwidth scavenger" applications.

Although FIG. 7 shows example functional components 700 of switched delivery system 118, in other implementations, switched delivery system 118 may include fewer functional components, different functional components, differently arranged functional components, or additional functional components than depicted in FIG. 7. Alternatively, or additionally, one or more functional components of switched delivery system 118 may perform one or more other tasks described as being performed by one or more other functional components of switched delivery system 118.

FIGS. 8-11 are flow charts of an example process 800 for providing hybrid video selection, delivery, and caching according to implementations described herein. In one implementation, process 800 may be performed by one or more devices of VHO 108 (e.g., SSSM server 112) and/or VSO 114 (e.g., switched delivery system 118). In another implementation, some or all of process 800 may be performed by another device or group of devices, including or excluding one or more devices of VHO 108 and/or VSO 114.

Figure 8:
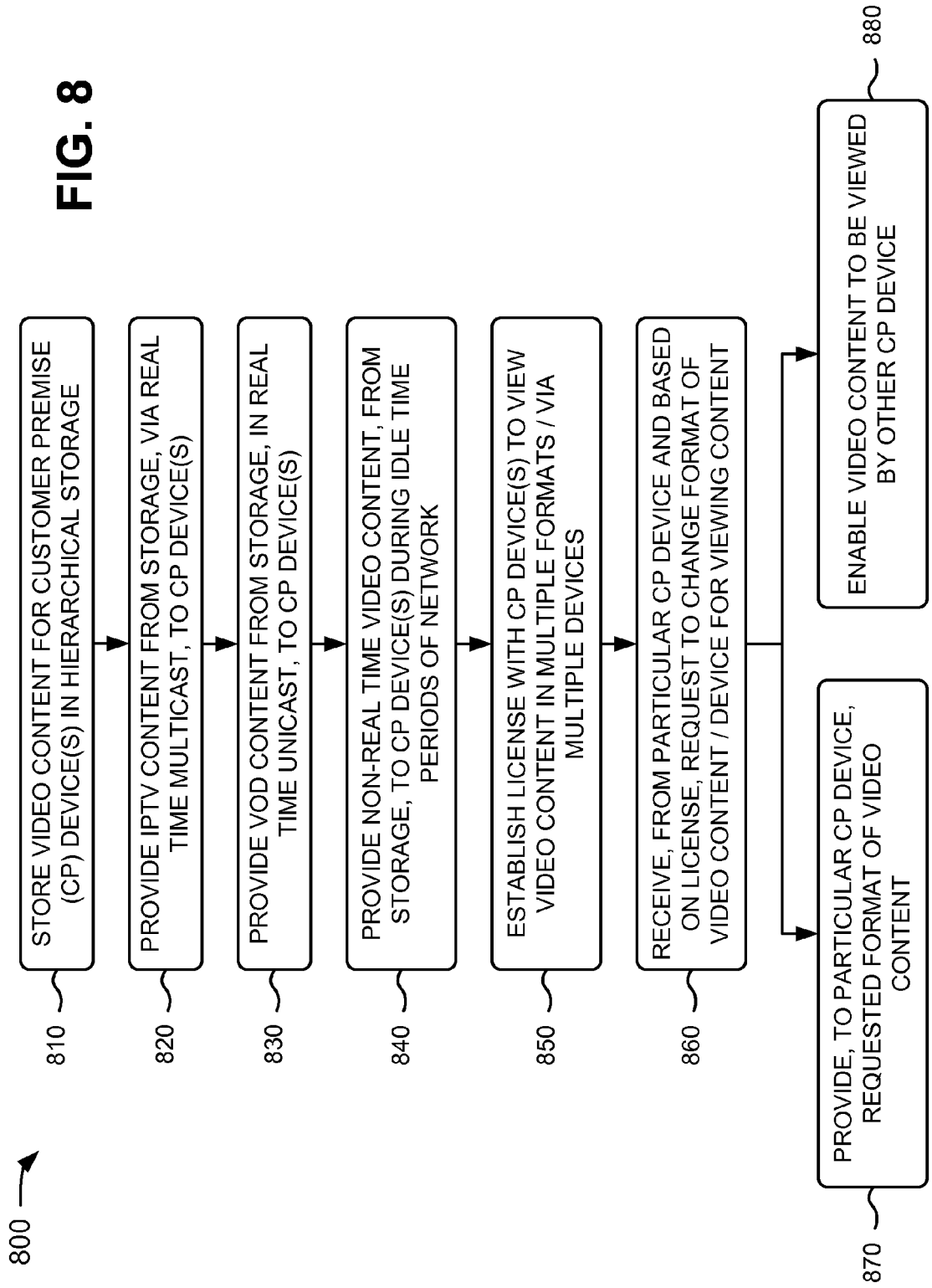

As illustrated in FIG. 8, process 800 may include storing video content for customer premise device(s) in a hierarchical storage (block 810). For example, in implementations described above in connection with FIG. 6, network portion 600 may depict a hierarchical cache (or storage) of video content. The most popular video content 610 (e.g., video content 310 and/or 320) may be cached at VSO 114 (e.g., in CDN storage 120 of VSO 114). Video content 620 (e.g., video content 330) that is less popular than video content 610 may be cached further in network 100, such as at VHO 108 (e.g., in CDN storage 110 of VHO 108). The least popular video content 630 (e.g., video content 340) may be cached at customer premise 122 (e.g., in one or more customer premise devices, such as HMD 128).

As further shown in FIG. 8, process 800 may include providing IPTV content from the hierarchical storage, via real time multicast, to the customer premise device(s) (block 820), and providing VOD content from the hierarchical storage, via real time unicast, to the customer premise device(s) (block 830). For example, in implementations described above in connection with FIG. 5, IPTV content (e.g., video content 320) may be provided to switched delivery system 118 via real time multicast, and VOD content (e.g., video content 330) may be provided to switched delivery system 118 via real time unicast. Switched delivery system 118 may provide video content 320-340 to BHR 126 (e.g., for further distribution to other customer premise devices). Network portion 500 may obtain the video content depicted in FIG. 5 (e.g., video content 320/330) from the hierarchical storage scheme depicted in FIG. 6.

Returning to FIG. 8, process 800 may include providing non-real time video content, from the hierarchical storage, to the customer premise device(s) during idle time periods of a network (block 840). For example, in implementations described above in connection with FIG. 5, best effort (BE) unicast may be used for delivery of non-real time video content (e.g., video content 340) to switched delivery system 118, and lower effort (LE) unicast and/or multicast may be used for delivery of non-real time video content (e.g., video content 340) to HMD 128. In one example, non-real time video content 340 may be provided during idle network times and may use low bandwidth access links (e.g., wireless access), and could use P4P for local redistribution of popular or missed content. Network portion 500 may obtain the video content depicted in FIG. 5 (e.g., video content 340) from the hierarchical storage scheme depicted in FIG. 6.

As further shown in FIG. 8, process 800 may include establishing a license with the customer premise device(s) to view video content in multiple formats and/or via multiple devices (block 850). For example, in implementations described above in connection with FIG. 4, multiple format/device license 415 may be exchanged between SSSM server 112, via switched delivery system 118, and BHR 126 attached devices. Multiple format/device license 415 may enable users associated with customer premise 122 to view video content on multiple customer premise devices (e.g., STB 124, television 130, and/or user device 132) and in multiple formats (e.g., high definition, three-dimensional, etc.). Multiple format/quality license 420 may be exchanged between SSSM server 112, via switched delivery system 118, and BHR 126 attached devices. Multiple format/quality license 420 may enable users associated with customer premise 122 to view video content in multiple formats (e.g., high definition, three-dimensional, etc.) and with different qualities on the same customer premise device (e.g., STB 124, television 130, and/or user device 132).

Returning to FIG. 8, process 800 may include receiving, from a particular customer premise device and based on the license, a request to change a format of video content or to change a device for viewing the video content (block 860). If the request is to change a format of the video content, process 800 may include providing, to the particular customer premise device, the requested format of the video content (block 870). If the request is to change a device, process 800 may include enabling the video content to be viewed by another customer premise device (block 880). For example, in implementations described above in connection with FIG. 4, multiple format/device license 415 may enable a user to begin video content on one device (e.g., television 130) and to pause, stop, and/or resume the video content on another device (e.g., user device 132). In one example, multiple format/quality license 420 may enable a user to dynamically change the format and/or quality of video content (e.g., switch between a high definition mode and a regular mode).

Figure 9:
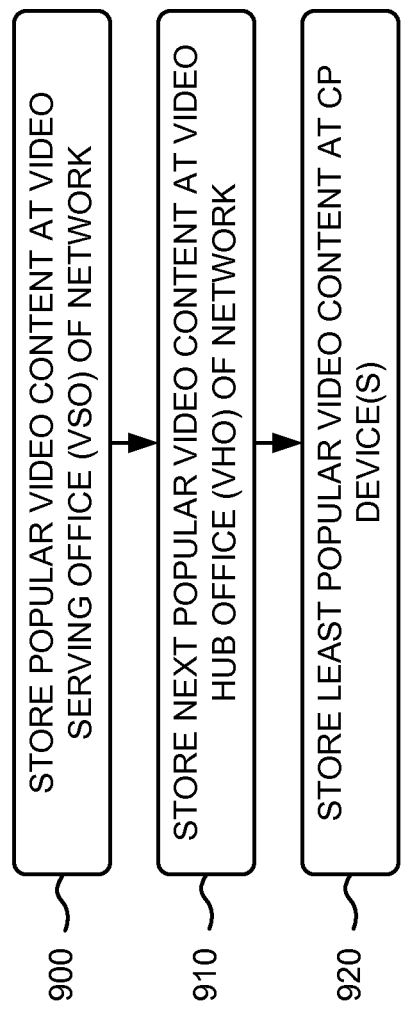

Process block 810 may include the process blocks depicted in FIG. 9. As shown in FIG. 9, process block 810 may include storing popular video content at a video serving office (VSO) of the network (block 900), storing next popular video content at a video hub office (VHO) of the network (block 910), and storing least popular video content at the customer premise device(s) (block 920). For example, in implementations described above in connection with FIG. 6, the most popular video content 610 (e.g., video content 310 and/or 320) may be cached at VSO 114 (e.g., in CDN storage 120 of VSO 114). Video content 620 (e.g., video content 330) that is less popular than video content 610 may be cached further in network 100, such as at VHO 108 (e.g., in CDN storage 110 of VHO 108). The least popular video content 630 (e.g., video content 340) may be cached at the customer premise (e.g., in one or more customer premise devices, such as HMD 128).

Process block 820 may include the process blocks depicted in FIG. 10. As shown in FIG. 10, process block 820 may include receiving requests for the same IPTV content from different customer premises (block 1000), batching the requests for the same IPTV content into a single request (block 1010), and providing, based on the single request, the same IPTV content to the different customer premises at the same time (block 1020). For example, in implementations described above in connection with FIG. 5, requests for the same video content (e.g., IPTV content) may be batched together as a single request, and the requested video content (e.g., IPTV content) may be delivered via multicast (e.g., to BHR 126, switched delivery system 118, and/or HMD 128) for efficiency.

Process block 840 may include the process blocks depicted in FIG. 11. As shown in FIG. 11, process block 840 may include receiving congestion feedback associated with the network (block 1100), scheduling the provision of the non-real time video content based on the congestion feedback (block 1110), and providing the non-real time video content to the customer premise device(s) based on the schedule (block 1120). For example, in implementations described above in connection with FIG. 7, SSSM servers 106/112 may receive congestion feedback information 755, may schedule provisioning of non-real time video content 340 based on congestion feedback information 755, and may determine when to forward non-real time video content 340 based on the determined schedule. In one example, if SSSM servers 106/112 detect network congestion (e.g., based on congestion feedback information 755), SSSM servers 106/112 may reduce or cease provisioning of non-real time video content 340. In another example, if SSSM servers 106/112 identify a time period (e.g., from 1:00 AM to 3:00 AM) as a time of little usage of network 100, SSSM servers 106/112 may request provisioning of non-real time video content 340 during this time period.

Systems and/or methods described herein may provide hybrid video content selection, delivery, and caching. For example, the systems and/or methods may provide a range of selection, subscription, and search mechanisms for video content, may provide multiple delivery methodologies for video content, and may provide efficient hierarchical cache (or storage) of video content.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices in a network that delivers media content, the method comprising:
    storing, in a set of queues of the one or more computing devices, multiple types of video content for delivery to one or more customer devices associated with a subscriber, in a hierarchical storage, the video content corresponding to a highest level of relative popularity in a video serving office (VSO), the video content corresponding to an intermediary level of relative popularity in a video hub office (VHO), and the video content corresponding to a lowest level of relative popularity in customer premises equipment (CPE) of the network, based on corresponding priorities;
    receiving, by a first scheduler of the one or more computing devices, real time video content from the hierarchical storage corresponding to the subscriber based on the corresponding priorities, and scheduling delivery of the real time video content to the one or more customer devices;
    retrieving, by the first scheduler of the one or more computing devices, non-real time video content from the hierarchical storage corresponding to the subscriber based on the corresponding priorities, and scheduling delivery of the non-real time video content to the one or more customer devices during idle time periods associated with the network;
    forwarding, by a second scheduler of the one or more computing devices, each of the scheduled video content from the first scheduler to the one or more customer devices, and other scheduled video content from another hierarchical storage corresponding to another subscriber, based on a schedule determined by the second scheduler;
    exchanging, between at least one of the one or more computing devices and the one or more customer devices, a license related to the delivery of a particular video content of the stored video content in multiple formats or via multiple customer devices associated with the subscriber;
    receiving, from a particular customer device of the one or more customer devices, a request for switching the delivery of the particular video content from:
        a first one of the multiple formats to a second one of the multiple formats, or
        the particular customer device to another customer device of the one or more customer devices; and
    delivering, responsive to the request and based on the exchanged license, the particular video content to the particular customer device in the second format or to the other customer device, wherein delivering the particular video content comprises the delivery of the non-real time video content and includes:

receiving congestion feedback information associated with the network, determining a schedule for the delivery of the non-real time video content based on the congestion feedback information, and delivering the non-real time video content to the one or more customer devices based on the determined schedule.

2. The method of claim 1, wherein the one or more computing devices are provided in one or more of:
a super head end (SHE) of the network,
the VHO of the network,
the VSO of the network, or
the CPE of the network.

3. The method of claim 1, wherein delivering the particular video content comprises the delivery of the real time video content and includes:
providing Internet protocol television (IPTV) content, via multicast, to the one or more customer devices; and
providing video on demand (VOD) content, via unicast, to the one or more customer devices.

4. The method of claim 3, wherein providing the IPTV content includes:
receiving requests for the same IPTV content from different customer premises associated with different subscribers in the network;
batching the requests for the same IPTV content into a single request; and
providing, based on the single request, the same IPTV content to the different customer premises at the same time.

5. The method of claim 1, further comprising:
storing broadcast television content at the VSO of the network;
storing Internet protocol television (IPTV) content and video on demand (VOD) content at the VHO of the network; and
storing the non-real time video content at the one or more customer devices.

6. The method of claim 1, wherein
receiving congestion feedback information includes receiving congestion feedback information based on a pre-congestion notification (PCN) method, wherein the PCN method includes:
configuring PCN threshold rates on edge and backbone links in a trusted domain,
comparing actual packet rates to the to the PCN threshold rates, and
marking packets that exceed the PCN threshold rates.

7. The method of claim 1, wherein receiving congestion feedback information includes:
receiving congestion feedback information based on a low extra delay background transport (ledbat) method.

8. The method of claim 1, where the non-real time video content includes one or more of:
over the top (OTT) video content,
Internet protocol (IP) unicast video content,
pre-recorded video content,
previous television episodes, or
advertisements.

9. One or more computing devices provided in a network that delivers media content, wherein at least one of the one or more computing devices is configured to:
cache, at a set of queues, multiple types of video content, for delivery to one or more customer devices associated with a subscriber, in a hierarchical storage, the video content corresponding to a highest level of relative popularity in a video serving office (VSO), the video content corresponding to an intermediary level of relative popularity in a video hub office (VHO), and the video content corresponding to a lowest level of relative popularity in customer premises equipment (CPE) of the network, based on corresponding priorities;

schedule, at a first scheduler, dequeuing of real time video content from the hierarchical storage corresponding to the subscriber based on the corresponding priorities, for providing to a second scheduler of the one or more computing devices;

schedule, at the first scheduler, dequeuing of non-real time video content from the hierarchical storage corresponding to the subscriber based on the corresponding priorities, and for providing to the second scheduler of the one or more computing devices;

forward, from the second scheduler, each of the dequeued video content from the first scheduler to the one or more customer devices, and other dequeued video content from another hierarchical storage corresponding to another subscriber, based on a schedule determined by the second scheduler;

exchange a first license, with the one or more customer devices, related to the delivery of a first particular video content of the cached video content in a plurality of desired formats;

exchange a second license, with the one or more customer devices, related to the delivery of a second particular video content of the cached video content via multiple customer devices associated with the subscriber;

receive, from a particular customer device of the one or more customer devices, a request for switching the delivery of:
the first particular video content from a first format to one of the desired formats, or
the second particular video content from the particular customer device to another customer device of the one or more customer devices; and deliver, responsive to the request and based on the first or second license, the first particular video content to the particular customer device in the desired format or the second particular video content to the other customer device.

10. The one or more computing devices of claim 9, wherein the one or more computing devices are provided in:
the VHO of the network, and
the VSO of the network.

11. The one or more computing devices of claim 9, where the real time video content includes one or more of:
broadcast television content,
Internet protocol television (IPTV) content, or
video on demand (VOD) content.

12. The one or more computing devices of claim 9, where the non-real time video content includes one or more of:
over the top (OTT) video content,
Internet protocol (IP) unicast video content,
pre-recorded video content,
previous television episodes, or
advertisements.

13. The one or more computing devices of claim 9, wherein, when scheduling the dequeuing of the real time video content, at least one of the one or more computing devices is further configured to:
receive requests for the same real time video content from different customer premises associated with different subscribers in the network;

batch the requests for the same real time video content into a single request; and provide, based on the single request, the same real time video content to the different customer premises at the same time.

14. The one or more computing devices of claim 9, wherein at least one of the one or more computing devices is further configured to:

store broadcast television content at the VSO of the network;

store Internet protocol television (IPTV) content and video on demand (VOD) content at the VHO of the network; and store the non-real time video content at the one or more customer devices.

15. The one or more computing devices of claim 9, wherein, when forwarding the non-real time video content, the second scheduler is further configured to:

receive congestion feedback information associated with the network;

determine a schedule for the delivery of the non-real time video content based on the congestion feedback information; and deliver the non-real time video content to the one or more customer devices based on the determined schedule.

16. The one or more computing devices of claim 15, where the congestion feedback information is provided via one or more of:

an explicit congestion notification (ECN) method, a pre-congestion notification (PCN) method, a re-inserted feedback explicit congestion notification (ECN) method, or a low extra delay background transport (ledbat) method.

17. A system, comprising:

one or more devices, including:

a set of queues for prioritizing queuing of multiple types of video content, for delivery to one or more customer devices associated with a delivery point associated with a network for delivering the video content, in a first hierarchical storage, the video content corresponding to a highest level of relative popularity in a video serving office (VSO), the video content corresponding to an intermediary level of relative popularity in a video hub office (VHO), and the video content corresponding to a lowest level of relative popularity in customer premises equipment (CPE) of the network, corresponding to the delivery point, based on a corresponding priority associated with a respective type of the video content, a first scheduler to:

schedule dequeuing of real time video content from the first hierarchical storage corresponding to the delivery point based on the relative priority, for provision to a second scheduler of the one or more devices, and schedule dequeuing of non-real time video content from the first hierarchical storage corresponding to the delivery point based on the relative priority, and for provision to the second scheduler, and the second scheduler, to forward each of the dequeued video content from the first scheduler to the one or more customer devices, and other dequeued video content from a second hierarchical storage corresponding to another delivery point, based on a schedule determined by the second scheduler.

18. The method of claim 1, wherein receiving congestion feedback information includes:

receiving congestion feedback information based on a re-inserted feedback explicit congestion notification (re-ECN) method, wherein the re-ECN method includes:

configuring congestion notification threshold rates on edge and backbone links in a non-trusted domain, comparing actual packet rates to the to the congestion notification threshold rates, and marking packets that exceed the congestion notification threshold rates.

19. The method of claim 1, wherein receiving congestion feedback information includes:

receiving congestion feedback information based on an explicit congestion notification (ECN) method, wherein the ECN method includes:

negotiating the ECN at endpoints of the network, setting an IP header bit in a packet as an indication of a beginning of the congestion, and forwarding the indication to the second scheduler.

* * * * *